3,005,840
METHOD OF PREPARING MONOMERIC
CYCLIC UNSATURATED ACIDS
Robert E. Beal, Elmwood, Ill., assignor to the United States of America as represented by the Secretary of Agriculture
No Drawing. Filed Aug. 23, 1960, Ser. No. 51,472
3 Claims. (Cl. 260—413)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

The invention herein described is an improved method of treating polyunsaturated vegetable drying oils containing linolenic acid, or the mixed free fatty acids thereof, to produce a monomeric cyclic unsaturated acid which is liquid at very low temperatures. Specifically, the oils or the mixed fatty acids are heated and stirred in the presence of alkali in excess of the amount required to saponify the acids in a polyhydric alcohol solvent, under an atmosphere of ethylene free of oxygen, at a temperature and for a time sufficient to cause the formation of low melting unsaturated fatty acids. The low-melting acids are then separated from polymeric acids formed during the reaction by high vacuum distillation. The essentially unsaturated distillate acids are then completely hydrogenated and contaminant stearic acid is separated therefrom by low temperature crystallization from solvent solution to yield the desired liquid saturated fatty acids.

It has long been recognized that when polyunsaturated fatty acids are heated to temperatures of 180° C. with excess alkali in the presence of a suitable solvent such as ethylene glycol, polyethylene glycol and the like, non-conjugated unsaturated double bonds shift to conjugated positions in substantial amounts. More recently it has been learned that on prolonged heating at temperatures of 200° to 300° C., in the presence of alkali and solvent, straight chain fatty acids containing triene unsaturation are conjugated and cyclized to fatty acids having a hexadiene ring in the chain.

The above known reaction is conducted under an oxygen-free inert atmosphere such as nitrogen or carbon dioxide, to prevent oxidation of the unsaturated fatty acids at the double bonds. In the present invention I have found that by conducting the conjugation-cyclization reaction in the presence of added free ethylene, substantially higher yields of the monomeric cyclic acid are formed than when the reaction is conducted under an inert atmosphere. The exact mode of the reaction which occurs when ethylene is present is not known, although it is noted that ethylene is consumed during the reaction and it may be concluded that it enters into the reaction in such a way as to increase the yield of cyclic monomeric fatty acid. Since the unsaturated monomeric cyclic fatty acids have commercial utility in the preparation of superior alkyd resins while the hydrogenated cyclic monomeric acids are used in low temperature lubricants, the improved yields over that shown in Example 3 have distinct commercial value.

To further describe the objects and results of this invention, the following examples are given:

*Example 1*

300 grams of 86 percent potassium hydroxide were dissolved in 2700 grams of ethylene glycol and placed in a 2-gallon stainless steel closed reaction vessel equipped with an agitator and means for introducing gas into the headspace under pressure. 900 grams of non-break linseed oil (iodine value 181.1, saponification equivalent 291) were added to the glycol-alkali solution in the vessel and a vacuum was drawn on the vessel to remove air from the headspace. Nitrogen was used to flush the vessel and was then introduced into the headspace of the vessel from a gas cylinder until the pressure in the vessel was 10 p.s.i. The vessel was closed, heated, and agitation was supplied until the contents reached a temperature of 220° C. At this time the pressure in the vessel had increased to 25 p.s.i. Ethylene was then introduced into the headspace until the pressure had increased to 45 p.s.i., and the reaction was continued for 6½ hours at 200° C. During this time the pressure in the vessel gradually decreased and additional ethylene was introduced four separate times at about equal intervals to restore the pressure in the vessel to 45 p.s.i. Then the vessel and its contents were cooled to room temperature and the reaction mixture was removed and poured slowly with stirring into 25 percent aqueous sulfuric acid in an amount sufficient to neutralize the alkali present and to convert the fatty soaps to fatty acids. The solution was further diluted with water and the fatty acid layer allowed to separate in a separatory funnel and the water layer removed. The fatty acids were distilled under an absolute pressure of 1 millimeter of mercury until the monomeric acids stopped distilling over and the polymeric dimer and trimer acids were left in the distilling flask. The yield was 105 grams (14.2 percent) of polymeric acids and 632 grams (85.8 percent) of light-colored mixed monomeric acids. The mixture of cyclic and straight chain monomeric acids was hydrogenated at 600 p.s.i. pressure at 150° C. in the presence of 0.2 percent palladium on carbon, for about 5 hours. A 5.21 gram aliquot of the hydrogenated mixed monomeric acids was dissolved in 10 volumes of acetone with heating, cooled to —60° C., and filtered at this temperature. The filter cake was redissolved in 10 volumes of acetone, cooled to —60° C. and again filtered. The filter cake after removal of solvent was substantially pure stearic acid with some palmitic acid. The two filtrates were combined and the solvent was removed by evaporation. The obtained monomeric saturated cyclic fatty acids were found to be liquid when cooled to —40° C. The yield of cyclic saturated monomeric acids was 2.36 grams (38.8 grams based on 85.8 grams of the mixed monomeric cyclic and straight chain acids) or 37.2 grams per 100 grams of linseed oil.

*Example 2*

The procedure of Example 1 was repeated using the same amounts of potassium hydroxide, ethylene glycol and linseed oil. After heating the reactants to the reaction temperature, 230° C. in this case, the pressure in the reactor was increased from 20 pounds p.s.i. (nitrogen) to 70 pounds p.s.i. by introducing ethylene, and this pressure was maintained throughout the reaction. Total reaction time was 9 hours. The fatty acids recovered after the reaction were distilled under high vacuum and 83.8 percent of distilled mixed monomeric acids was obtained (based on the fatty acid content of the oil). The distillate, after hydrogenation and solvent crystallization was found to comprise 38.0 percent of saturated cyclic monomeric fatty acids (based on the fatty acid content of the oil), or 36.4 grams per 100 grams of linseed oil.

*Example 3*

Five lbs. of 86 percent potassium hydroxide and 50.8 lbs. of ethylene glycol were placed in a stainless steel autoclave and heated slightly, and stirred until dissolved. Then 15.2 lbs. of the same linseed oil as used in Example 1 was added, air was removed from the vessel and the mixture was heated to 220° C. under nitrogen. No ethylene was added. The reaction was continued under these conditions for 8 hours, aliquots being removed at 2 hour intervals for analysis. The fatty acids recovered from the cyclization reaction comprised 84.4 percent mixed monomeric acids (based on the fatty acid content of the oil) and the distillate contained 38.3 percent monomeric cyclic acids. Yield of cyclic acids was 30.9 grams per 100 grams of oil. When this reaction was continued for 10 hours no increase in yield was obtained.

It may be seen from the above examples that an increased absolute yield of about 6 grams of cyclic acids per 100 grams of oil (a 20 percent increase) was obtained by conducting the reaction under added ethylene as compared with nitrogen.

Citing these examples is not intended to restrict the temperature of the reaction to those given in the example nor the amounts of reagents to those given. Reduction in the amount of excess alkali over that required to saponify the oil, (from 48 percent excess as given in Example 1, to 10 percent excess) necessitates an increase in reaction time to obtain maximum yield. Reduction in the amount of solvent used, decreases the yield somewhat. Increasing the temperature shortens the reaction time and results in some increase in yield. Other polyhydroxy alcohols may be used as solvents for the reaction and other bases may be used.

Having thusly disclosed my invention, I claim:

1. A method for preparing monomeric cyclic unsaturated acids comprising heating, at a temperature of about from 150° C. to 300° C., a member selected from the group consisting of polyunsaturated vegetable oils containing linolenic acid and the mixed free fatty acids thereof with excess alkali in an inert solvent and an inert atmosphere containing ethylene under pressure of at least about 45 p.s.i.

2. A method for preparing monomeric cyclic unsaturated acids comprising heating, at a temperature of about from 150° C. to 300° C., linseed oil with excess alkali in an inert solvent and an inert atmosphere containing ethylene under pressure of at least about 45 p.s.i.

3. A method of preparing monomeric cyclic unsaturated acids comprising heating, at a temperature of about from 150° C. to 300° C., in a closed vessel, linseed oil dissolved in a glycol solvent with an excess of alkali under an atmosphere of nitrogen, the while introducing ethylene into the vessel at a pressure of at least about 45 p.s.i.

No references cited.